United States Patent
Lundborg

(10) Patent No.: US 6,782,262 B1
(45) Date of Patent: *Aug. 24, 2004

(54) SELF-TUNING SUFFICIENT SIGNAL STRENGTH THRESHOLD

(75) Inventor: Tomas Lundborg, Stockholm (SE)

(73) Assignee: Telefonaktiebolaget LM Ericsson, Stockholm (SE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/179,958

(22) Filed: Oct. 28, 1998

(51) Int. Cl.[7] ............................................. H04Q 7/20
(52) U.S. Cl. ...................... 455/449; 455/444; 455/436
(58) Field of Search ................................ 455/436, 437, 455/438, 439, 449, 443, 444; 4/423

(56) References Cited

U.S. PATENT DOCUMENTS

| 4,435,840 A | * | 3/1984 | Kojima et al. ................ 455/33 |
| 4,670,899 A | * | 6/1987 | Brody et al. ................ 455/453 |
| 5,175,867 A | * | 12/1992 | Wejke et al. ............... 455/33.1 |
| 5,241,685 A | * | 8/1993 | Bodin et al. ............... 455/33.2 |
| 5,257,402 A | * | 10/1993 | Crisler ....................... 455/33.2 |
| 5,353,332 A | | 10/1994 | Raith et al. |
| 5,499,386 A | | 3/1996 | Karlsson |
| 5,504,938 A | * | 4/1996 | Redden ...................... 455/12.1 |
| 5,557,657 A | | 9/1996 | Barnett |
| 5,572,221 A | | 11/1996 | Marlevi et al. |
| 5,640,677 A | * | 6/1997 | Karlsson .................... 455/33.2 |
| 5,701,585 A | | 12/1997 | Kallin et al. |
| 5,765,103 A | * | 6/1998 | Chang et al. ............... 455/434 |

FOREIGN PATENT DOCUMENTS

| EP | 0 504 122 | | 9/1992 | |
| GB | 2323740 | * | 3/1997 | ............ H04Q/7/38 |
| GB | 2 313 740 | | 12/1997 | |

* cited by examiner

*Primary Examiner*—Tilahun Gesesse

(57) ABSTRACT

In a hierarchical cell structure, the parameter for setting a signal strength threshold which determines the selection of serving cell, along with the preference rating of umbrella macrocells, microcells and picocells in a cellular telephone system, is related to a quality criteria, such as speech quality. The "sufficient signal strength" threshold is automatically tuned according to the quality criteria thereby avoiding the need for expensive, time consuming manual adjustment of this parameter.

21 Claims, 5 Drawing Sheets

SELF-TUNING SUFFICIENT SIGNAL STRENGTH THRESHOLD

BACKGROUND OF THE INVENTION

1. Field of the Invention

The invention relates to the setting of thresholds for handoff of mobile stations within a cellular radio system and, more particularly, to a method and apparatus for self-tuning a parameter indicating the minimum, sufficient signal strength threshold used in determining whether or not a preferred cell is suitable for communication in a hierarchical cell structure of, e.g., macrocells, microcells and picocells.

2. Related Art

In cellular radio communication systems a geographic area is divided into a plurality of individual regions referred to as cells. Each of these cells is provided with radio service on a plurality of separate RF channels the frequencies of which are reused among different cells. The different cells are separated from one another that there is a sufficiently low level of interference between them. When a mobile station receiving radio service from a particular base station serving a particular cell moves from that cell into another adjacent cell communication with the mobile station is "handed off" from the first base station to the second base station serving the adjacent cell. Such handoff is typically accomplished by a mobile switching center (MSC) to which all of the base stations are connected and which controls the allocation of communication channels to the individual mobiles moving throughout the region served by the cells.

As the demand for cellular radio service increases over time, the capacity of existing systems has been severely stressed to serve all the subscribers who would like to have access to the system, particularly in major metropolitan areas. To address this demand, cellular radio technology is moving to digital based systems such as time division multiple access (TDMA) in which a plurality of subscriber channels can be assigned to each radio channel. In a TDMA system, each channel is divided by time slots, such that information is transmitted in the same frequency but at different times as other radio signals. The received signals are separated or demodulated according to appropriate decoding.

However, even with such improvements in channel capacity, there exist certain areas within major metropolitan areas in which the demands on the system are so great that it cannot be successfully satisfied by existing cellular radio architectures. For example, in the area in and around a convention center located in a major metropolitan area, the channel usage by portable cellular radio transceivers may be so great that the demands for service cannot be satisfied by the entire channel capacity of the base station serving the cell within which the convention center is located. In such situations, it has been proposed to provide additional "layers" of cellular radio coverage provided by additional lower powered base stations located within an existing, so-called "umbrella" cell and referred to as "microcells". Such microcells may have a coverage or service area on the order of a few hundred meters in contrast to a few kilometers of coverage by the base station of the overlying umbrella cell. A plurality of such microcells may be located adjacent to one another and form a contiguous coverage area of substantial width all of which is within the overall coverage area of the umbrella cell.

When a layered cell structure, as described above in conjunction with umbrella cells and microcells, is used there is provided an enhanced level of radio capacity which can be configured for individual circumstances and which provides an assurance that users can receive service despite an extremely high demand within a small geographic area. Moreover, additional layers of radio coverage may be added, for example, by a plurality of either contiguous or separated picocells positioned within the coverage or service area of the individual microcells, each of which are in turn within the overall umbrella cell. The base stations providing the radio coverage within the picocells would be of even still lower power than the base stations serving the microcells and have a coverage or service area of, for example, a hundred meters to provide coverage within a single building or a single floor within a large convention center.

Thus, in layered cell architectures, the issue of base station server selection and handoff of each mobile radio transceiver moving within a geographic area involves many more options. That is, it is possible for the mobile station to receive radio service at any given moment from either a picocell base station, a microcell base station, or an umbrella cell base station. When conventional handoff criteria designed for use in single layered cellular architectures are applied to this situation, problems arise and the solution is less than ideal. The ability to configure the handoff mechanism for maximum efficiency with respect to the utilization of channel availability and consistent with high quality radio service to each mobile subscriber is highly desirable.

When handoff is effected between adjacent cells in a single layer cellular radio architecture, the principle criterion used is the comparison of the quality of the signal received from the mobile station by the respective base stations capable of providing radio service. Alternatively, the mobile station may perform measurements on signals received from the base station of the serving cell and from base stations of adjacent cells and report the results to the serving base station. That is, the signal quality of the serving cell is compared with the signal quality of an adjacent cell and when the quality of signal in the latter exceeds the former, the mobile station is handed off to the base station serving the adjacent cell. In addition, a signal quality increment, known as an offset or hysteresis, is also applied to the signal quality difference value so that unless the signal quality in the adjacent base station is at least "x" amount greater than the presently serving base station, handoff does not occur. This prevents oscillating handoffs due to signal quality perturbations in which the mobile is repeatedly handed back and forth between two adjacent base stations.

As disclosed in U.S. Pat. No. 5,499,386 issued to Bror Karlsson, (herein incorporated by reference) to optimize service quality and capacity, it is preferable to serve mobile stations with the lowest possible level of base station transmission power while assuring that sufficient signal quality exists. Hence, there is generally a preference to serve mobile stations in pico or microcells, rather than umbrella cells which has fewer total channels available for service than the plurality of adjacent microcells would have. Pico and microcells are thus defined as 'preferred' cells and umbrella cells as 'non-preferred' cells. The Karlsson patent introduces a system of handoff algorithms which maximize the efficient utilization of channel availability within a multi-level or hierarchical cellular radio architecture. In Ericsson's CMS8800 system, a mobile station is served by the base station of a cell belonging to the preferred level as long as the measured signal strength, which is closely related to the signal quality of that particular cell, is above a selected minimum value, i.e. the "sufficient signal strength" parameter SSSUF. The sufficient signal strength parameter is used to define the lowest signal strength level at which the preferred cell will be prioritized over a non-preferred cell.

Within a certain range of interference and noise in a cell, the setting of the sufficient signal strength parameter will determine the call quality in the cell.

However, the setting of these parameters is done manually in conventional systems such as Ericsson's CMS8800 system which utilizes the concept of hierarchical cell structure to force traffic from non-preferred cells into preferred cells even though the non-preferred cell may provide a higher signal strength.

The tuning of this and other parameters for microcells and picocells is time consuming and often inaccurate. In a congested network, there may be thousands of micro and picocells each serving a fairly small amount of traffic. Considering the relatively small returns in subscriber fees for each of these cells, it is often not cost effective to spend too much time in fine tuning the parameters of every single cell. To minimize this work, a common parameter setting is often used for all microcells or picocells. The selection of such parameters is often a trade-off between quality and capacity. Since the parameters are not tuned individually in each cell, the handoff mechanism may be satisfactory in some cells and not so good in others. There may thus be call quality problems in some cells, e.g., if the level of co-channel interference on the frequencies used in the microcell is high due to short re-use distances. In that case, a relatively high value of SSSUF is needed. On the other hand, if a high value of SSSUF is used in general to safeguard quality, the usage of the micro and picocells, i.e. preferred cells, will decrease, thus limiting the overall system capacity. In the best case, system measurements are conducted to set such parameters as the sufficient signal strength parameter.

SUMMARY OF THE INVENTION

In one aspect of the invention, the parameters used to define the lowest signal strength level at which a preferred cell will be prioritized over a non-preferred cell is automatically tuned based on a signal quality criteria. For instance, the signal quality criteria can be speech quality.

Specifically, the present invention includes a method of determining a minimum acceptable, i.e., sufficient, signal strength in a cell of a hierarchical cell structure comprised of multiple levels of cells having different service areas and including base stations and mobile stations. The method comprising the steps of: 1) assigning to each cell according to a cell level a category of preference for selection with respect to each other associated cell within the system having either a coextensive, adjacent, contiguous, or overlapping service area; 2) assigning to each associated cell a preselected sufficient signal strength threshold; and 3) at least initially adjusting said threshold in accordance with a measured quality criteria.

In the exemplary embodiment the method measures the speech quality by a bit error rate (BER). In accordance with this method the adjusting of the preselected sufficient signal strength threshold includes the following algorithm:

If BER>1% for more than 2% of the call time in a cell, the preselected sufficient signal strength threshold is increased by 1 dB; and
if BER>1% for less than 0.5% of the call time in this cell, the preselected sufficient signal strength threshold is decreased by 1 dB.

Alternatively, the method can adjust the preselected sufficient signal strength threshold with a non-recursive, statistical relationship estimate of how much the signal strength threshold should be increased or decreased, such as by determining the probability of a bit error rate being greater than 1% for a given threshold level and determining a threshold level to be increased or decreased to assure that that probability is within a given range.

The present invention can be embodied as a method of handoff of a mobile station operating within a cellular radio system in a hierarchical cell structure comprised of multiple levels of cells having different service areas and including base stations and mobile stations, the method comprising the steps of: 1) assigning to each cell according to a cell level a category of preference for selection with respect to each other associated cell within the system having either a coextensive, adjacent, contiguous, or overlapping service area; 2) assigning to each associated cell a preselected sufficient signal strength threshold; 3) at least initially adjusting the preselected sufficient signal strength threshold in accordance with a measured quality criteria; 4) measuring the signal strength of communications between the mobile station and each base station serving the associated cells; 5) comparing the measured signal strength to the preselected thresholds for each of the measured cells; 6) and selecting for the mobile station a base station for a communication based upon whether the measured signal strength of the base station is greater than the preselected sufficient signal strength threshold assigned to the cell and whether the base station has a higher category of preference than the currently serving cell.

Further, the present invention can be embodied in an apparatus for determining a minimum acceptable signal strength in a cell of a hierarchical cell structure comprised of multiple levels of cells having different service areas and including base stations and mobile stations, the apparatus comprising: 1) means for assigning to each cell according to a cell level a category of preference for selection with respect to each other associated cell within the system having either a coextensive, adjacent, contiguous, or overlapping service area; 2) means for assigning to each associated cell a preselected sufficient signal strength threshold; 3) means for at least initially adjusting the preselected sufficient signal strength threshold in accordance with a measured quality criteria.

BRIEF DESCRIPTION OF THE DRAWINGS

For a more complete understanding of the present invention and for further objects and advantages thereof, reference is now made to the following description taken in conjunction with the accompanying drawings, in which.

DETAILED DESCRIPTION

In the following description, for purposes of explanation and not limitation, specific details such as particular components, techniques, etc., are set forth in order to provide a thorough understanding of the present invention. However, it will be apparent to those skilled in the art that the present invention may be practiced in other embodiments that depart from the specific details. In other instances, detailed descriptions of well known methods, devices and circuits are omitted so as to not obscure the description of the present invention.

Figure 1:
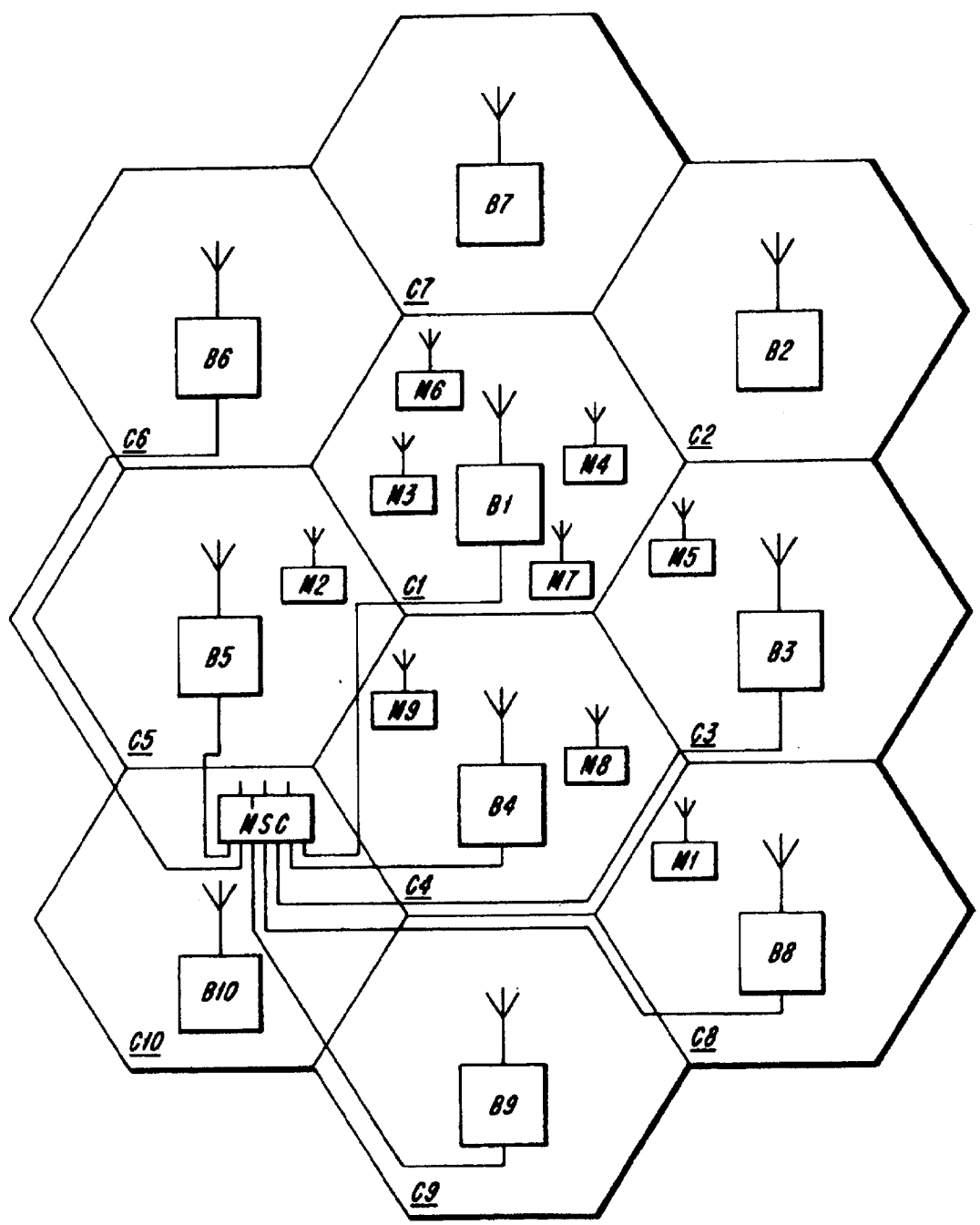
FIG. 1 is a representation of a single level cellular radio communication system including a mobile switching center, a plurality of base stations and a plurality of mobile stations.

Referring first to FIG. 1, there is illustrated a conventional single layer cellular radio communication system of the type to which the present invention has a relationship. In FIG. 1, an arbitrary geographic area may be divided into a plurality of contiguous radio coverage areas, or cells C1–C10. While the system of FIG. 1 is illustratively shown to include only 10 cells, it should be clearly understood that in practice, the number of cells will be much larger.

Associated with and located within each of the cells C1–C10 is a base station designated as a corresponding one of a plurality of base stations B1–B10. Each of the base stations B1–B10 includes a transmitter, receiver, and base station controller as is well known in the art. In FIG. 1, the base stations B1–B10 are illustratively located at the center of each of the cells C1–C10, respectively, and are equipped with omni-directional antennas. However, in other configurations of a cellular radio system, the base stations B1–B10 may be located near the periphery, or otherwise away from the centers of the cells C1–C10 and may illuminate the cells C1–C10 with radio signals either omni-directionally or directionally. Therefore, the representation of the cellular radio system of FIG. 1 is for purposes of illustration of a single level cellular radio system only and is not intended as a limitation on the possible implementations of the cellular radio system within which the system of the present invention may find utility.

With continuing reference to FIG. 1, a plurality of mobile stations M1–M10 may be found within the cells C1–C10. Again, only 10 mobile stations are shown in FIG. 1 but it should be understood that the actual number of mobile stations will be much larger in practice and will invariably greatly exceed the number of base stations. Moreover, while none of the mobile stations M1–M10 will be found in some the cells C1–C10, the presence or absence of the mobile stations M1–M10 in any particular one of the cells C1–C10 should be understood to depend, in practice on the individual-desires of the mobile stations M1–M10 who may move from one location in the cell to another or from one cell to an adjacent cell or neighboring cell, and even roam from one cellular radio system served by a Mobile Switching Center (MSC) to another system.

Each of the mobile stations M1–M10 is capable of initiating or receiving a telephone call via one or more of the base stations B1–B10 and a mobile switching center (MSC). A MSC is connected by communication links, e.g. cables, to each of the illustrative base stations B1–B10 and to the fixed public switch telephone network (PSTN), not shown, or a similar fixed network which may include an integrated system digital network (ISDN) facility. The relevant connections between the MSC and the base stations B1–B10, or between the MSC and the PSTN or ISDN, are not completely shown in FIG. 1 but are well known to those of ordinary skill in the art. Similarly, it is also known to include more than one MSC in the cellular radio system and to connect each additional MSC to a different group of base stations and to other MSCs via cable or radio links.

Each of the cells C1–C10 is allocated a plurality of voice or speech channels and at least one access or control channel. The control channel is used to control or supervise the operation of mobile stations by means of information transmitted to and received from those units. Such information may include incoming call signals, outgoing call signals, page signals, page response signals, location registration signals, voice channel assignments, and maintenance instructions as the mobile station travels out of the radio coverage of one cell and into the radio coverage of another cell. The control or voice channels may operate either in an analog or digital mode or a combination thereof.

FIG. 1 illustrates a relatively conventional single level cellular structure in which mobile stations are handed off from one cell to another by it being served with radio channels in communication with first one base station and then an adjacent base station based upon the signal levels as received either by the mobile station or by each of the respective base stations. Handoff decisions may be based on downlink measurements (MAHO) or uplink measurements or a combination of both.

Figure 2:
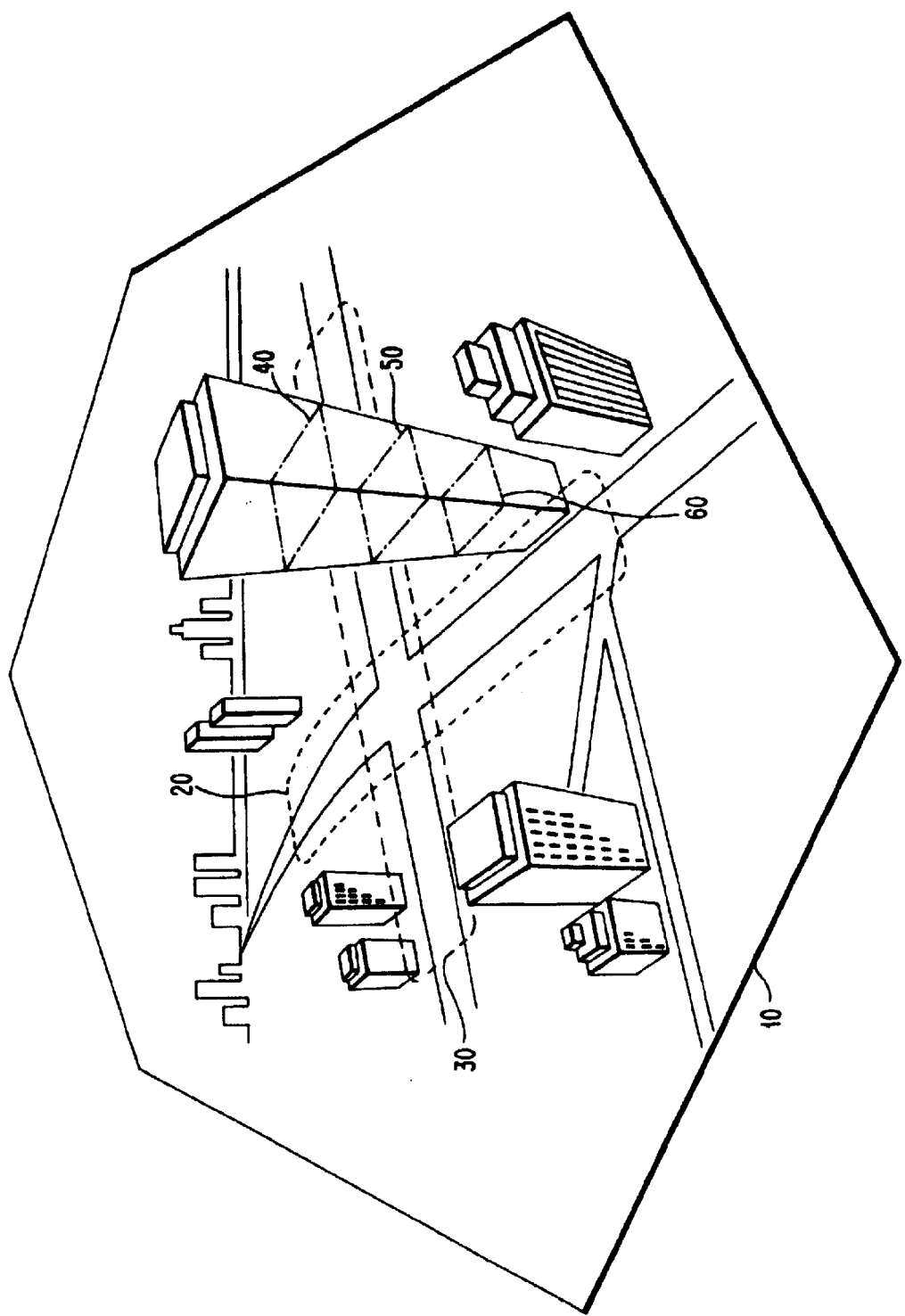
FIG. 2 illustrates an exemplary multi-layered cellular system employing umbrella macrocells, microcells, and picocells.

FIG. 2 is an exemplary multi-layered cellular system. An umbrella macrocell 10 represented by a hexagonal shape makes up an overlying cellular structure. Each umbrella cell may contain an underlying microcell structure. The umbrella cell 10 includes microcell 20 represented by the area enclosed within the dotted line and microcell 30 represented by the area enclosed within the dashed line corresponding to areas along city streets, and picocells 40, 50, and 60, which cover individual floors of a building. The intersection of the two city streets covered by the microcells 20 and 30 may be an area of dense traffic concentration, and thus might represent a hot spot. Further details of this system are disclosed in U.S. Pat. No. 5,353,332 issued to Alex Raith, herein incorporated by reference.

A mobile station periodically scans during idle mode the control channels in the coverage area that the mobile is located in to determine which cell it should be locked to. Thus, a mobile station may continuously select cells to be locked to based on the existing location of the mobile station and quality criteria (e.g., received signal strength) associated with the cells. The cell to which the mobile station may be locked is the cell in which the mobile satisfies the quality criteria associated with the cell. For example, the most underlying cell based on capacity considerations may be designated by the system operator as a 'preferred' cell.

The above cell selection and reselection criteria involves measurement of received signal strengths on respective control channels. By comparing the set of measurements and parameters of different control channels, the mobile can select the most appropriate cell. Further, the service profile of a candidate cell may also determine the selection of control channels (cells). Service profile information might include information such as whether a half rate or full rate speech coder is being used; the data bit transmission rate; and the type of data the cell can handle, i.e., data, voice, and data and voice.

Figure 3:
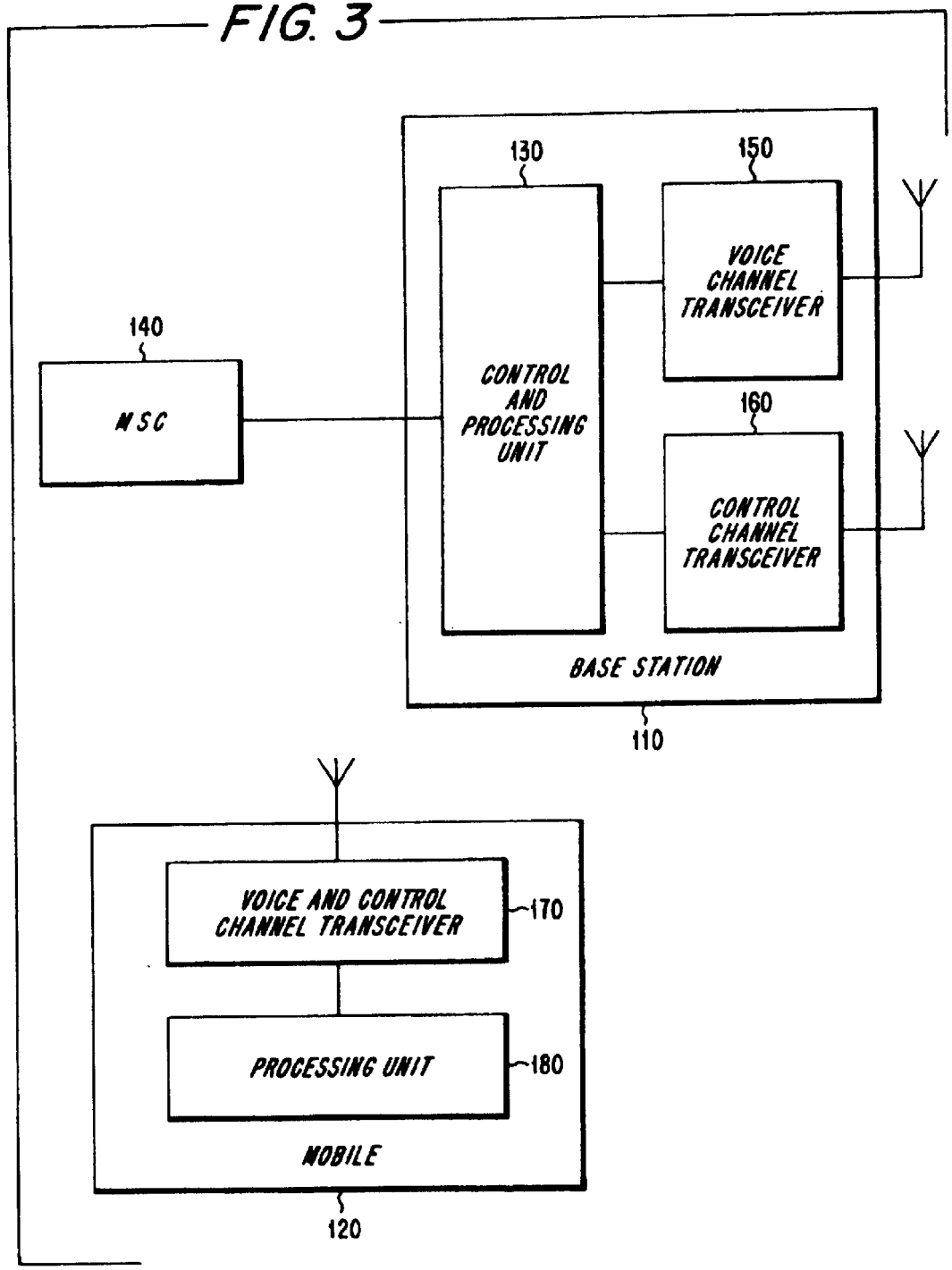
FIG. 3 illustrates an exemplary implementation of an apparatus of a radio telephone system including a base station and a mobile station.

FIG. 3 represents a block diagram of an exemplary cellular mobile radiotelephone system. The system shows an exemplary base station 110 and a mobile station 120. The base station includes a control and processing unit 130 which is connected to the MSC 140 which in turn is connected to the public switched telephone network (not shown). General aspects of such cellular radiotelephone systems are known in the art. An exemplary system can be found in the earlier mentioned U.S. Pat. No. 5,353,332.

The base station 110 for a cell includes a plurality of voice channels handled by voice channel transceiver 150 which is controlled by the control and processing unit 130. Also, each base station includes a control channel transceiver 160 which may be capable of handling more than one control channel. The control channel transceiver 160 is controlled by the control and processing unit 130. The control channel transceiver 160 broadcasts control information over the control channel of the base station or cell to mobiles locked to that control channel.

When the mobile 120 is in idle mode, it periodically scans the control channels of base stations like base station 110 to determine which cell to lock to or camp on. The mobile station 120 receives information broadcasted on a control channel at its voice and control channel transceiver 170. Then, the processing unit 180 evaluates the received control channel information which includes the characteristics of the candidate cells and determines to which cell the mobile station should be locked.

Figure 4:
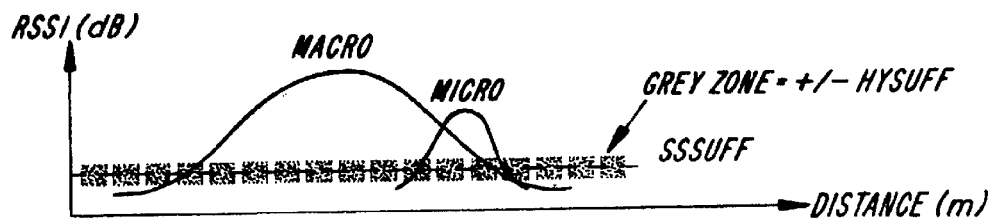
FIG. 4 is a graph showing the relationship between received signal strength and hand-off decisions.

FIG. 4 shows that, in a hierarchical cell structure, handoff in and out of a microcell is done when the receive signal strength (RSSI) received from the microcell is above or below the sufficient signal strength level plus or minus a hysteresis value. Cells in a lower level, e.g. microcells, are classified as 'preferred cells' compared with the 'non-preferred' overlying cells, e.g. macrocells. If the RSSI in a preferred cell is above the minimum acceptable signal strength, e.g. SSSUF plus hysteresis, this cell is selected even if the RSSI is higher in the non-preferred cell. The hysteresis value is used together with the sufficient signal strength parameter when handoff decisions are made, as explained above. This means that the handoff to the cell is actually done when the received signal strength indicator (RSSI) is greater than this sufficient signal strength parameter (SSSUF) plus the hysteresis value (HYSUF) and out of the cell when the RSSI is less than SSSUF minus HYSUF.

In accordance with the present invention, the sufficient signal strength parameter SSSUF is automatically tuned to overcome the problems associated with the time consuming and inaccurate previous methods of tuning of this and other parameters for microcells and picocells without resort to a common parameter setting for all microcells or picocells. The automatic tuning is based on signal quality criteria. Specifically, the signal quality criteria can be speech quality which is determined, e.g. by measuring bit error rate (BER) on the traffic present in the cell over a period of time (5–30 minutes for example), preferably when the traffic load is high. One of the more critical factors for setting the sufficient signal strength parameter is the carrier to interference ratio (C/I) which relates closely to the BER. To get a good speech quality in the cell, the BER should not be above a certain threshold for more than a certain percentage of time.

The sufficient signal strength parameter SSSUF is adjusted according to the measured quality. After such an adjustment, the quality must be measured again and the sufficient signal strength parameter SSSUF may be adjusted again.

With these factors in mind, one embodiment of the present invention relates the setting of the sufficient signal strength parameter to the bit error rate according to the following recursive algorithm:

If BER>1% for more than 2% of the call time in a cell, the sufficient signal strength parameter SSSUF is increased by 1 dB; and if BER>1% for less than 0.5% of the call time in this cell, the sufficient signal strength parameter SSSUF is decreased by 1 dB.

Naturally, other specific values can be adopted to optimize a given system.

In another embodiment of the present invention, a non-recursive, direct estimate of how much of an increase or decrease should be imposed on the sufficient signal strength parameter using a statistical relationship between the BER and the ratio of the carrier signal to the sum of the interference and noise (C/(I+N)). A certain probability for, e.g., BER greater than 1% will be related to a certain threshold increase or decrease, e.g., a certain number of dBs to be added to or subtracted from the sufficient signal strength parameter if the target is, for example, 90%.

An exemplary implementation is as follows: to determine the current call quality in a cell, the probability of BER<1% during a high traffic period is measured. From measurements in the D-AMPS system, for example, the relationship between the probability of BER<1% and C/(I+N) has been established. See FIG. 5. The measured probability can then be translated to a C/(I+N) estimate Qm. Similarly, the required quality level in the cell (probability of BER<1%) is translated to a C/(I+N) value Qt. The proper value to add to the sufficient signal strength parameter SSSUF will then be equal to (Qt−Qm)dB.

Figure 5:
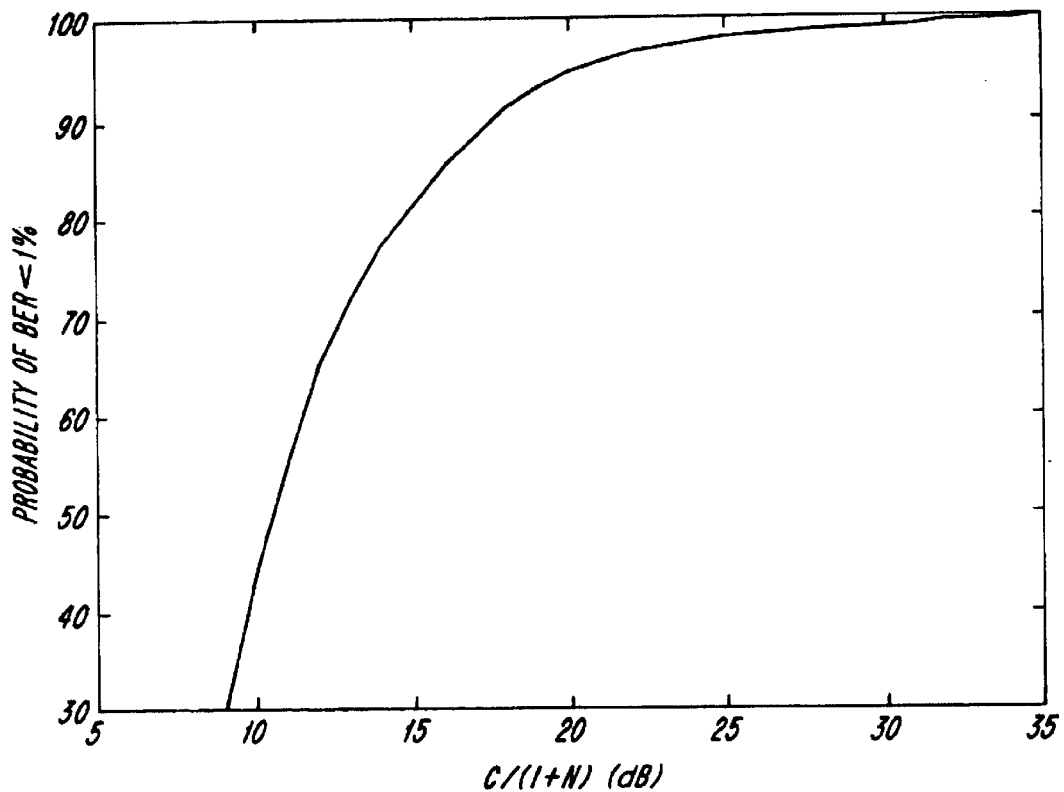
FIG. 5 is a graph mapping C/(I+N) to the probability of BER<1%.

From FIG. 5 it can be seen that if the probability of the BER being less than 1% is 80%, the carrier to interference ratio (C/I) should be increased by about 3 dBs to reach 90%. Similarly, by adding 3 dBs to the sufficient signal strength parameter value will achieve the same result because the carrier is increased while the interference and noise will remain the same. The adjustment given by the algorithm can either be used in a "closed loop", i.e. the system adjusts itself without interaction with the operator, or in an "open loop" where the operator is presented with a calculated value which he can chose to use or not to use.

Figure 6:
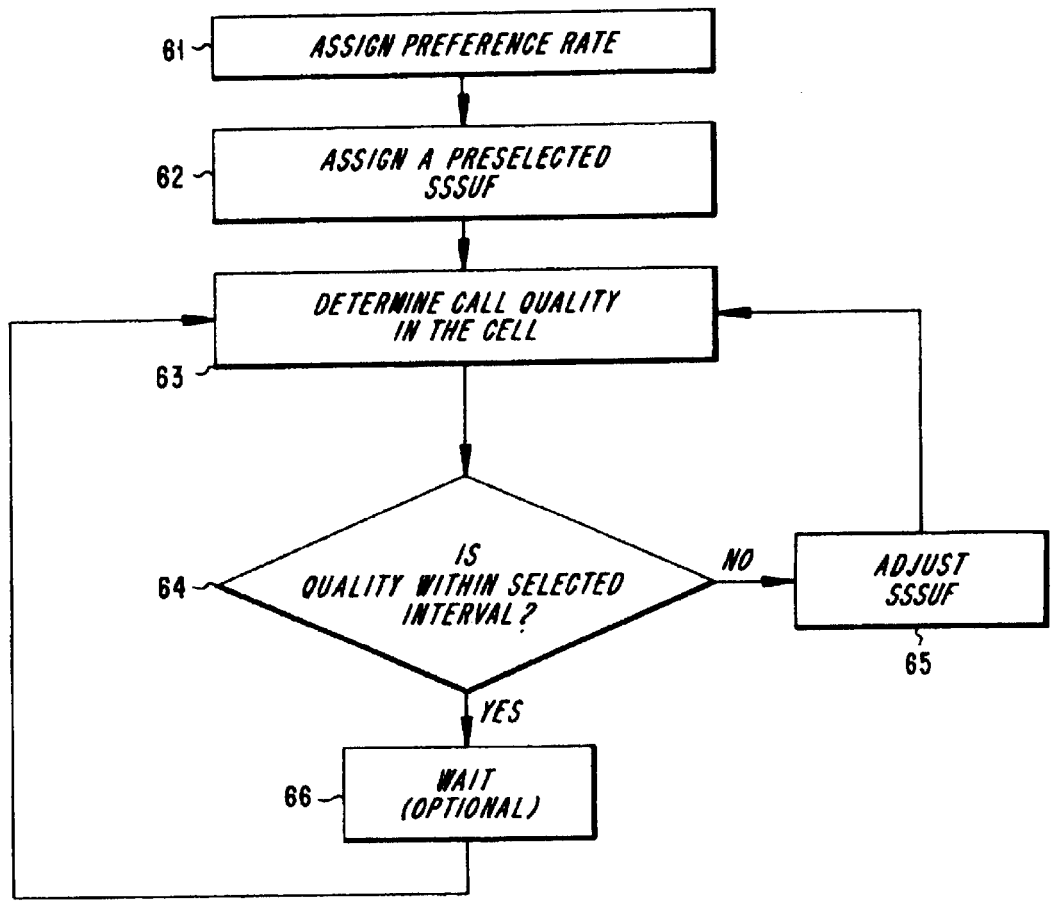
FIG. 6 is a flow chart illustrating an aspect of the present invention.

FIG. 6 illustrates an exemplary flow of the inventive method of determining a minimum acceptable (i.e. sufficient) signal strength in a preferred cell of a hierarchical cell structure of multiple levels of cells having different service areas and including base stations and mobile stations. At step 61, each cell according to a cell level is assigned a category of preference for selection with respect to each other associated cell within the system having either a coextensive, adjacent, contiguous, or overlapping service area. At step 62, each associated cell is assigned a preselected signal strength threshold SSSUF. At step 63, the call quality in the cell is determined. At step 64, it is determined whether the call quality is within a selected range. If it is not, at step 65, the current sufficient signal strength threshold SSSUF is adjusted in accordance with a measured quality criteria such that SSSUF is increased if the quality is too low and decreased if the quality is too high. If the call quality is within the selected range, then at optional step 66, a delay or waiting period is timed out, and the method returns to a call quality determining step 64. Naturally, the sufficient signal strength threshold can be adjusted at various times as dictated by circumstances, such as the introduction of a new picocell, microcell, or macrocell.

Figure 7:
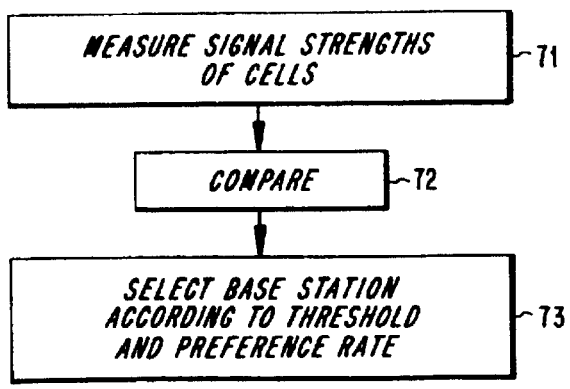
FIG. 7 is a flow chart illustrating the process of selecting a base station.

As shown in FIG. 7, the present invention can also be embodied in a method of handoff or a mobile station operating within a cellular radio system in a hierarchical cell structure comprised of multiple levels of cells having different service areas and including base stations and mobile stations. In this case, the method further includes step 71 of measuring the signal strength of communications between the mobile station and each base station serving the associated cells; step 72 of comparing the measured signal strength to the thresholds set for each of the measured cells respectively; and step 73 of selecting for the mobile station a base station for communication based upon whether the measured signal strength of the base station is greater than the current signal strength threshold assigned to the cell and whether the base station has a higher category of preference than the currently serving cell. This last step can be implemented in the mobile station or in the network.

As mentioned before, the quality criteria is speech quality and the setting of the preselected signal strength threshold is related to a carrier to interference ratio. In one embodiment the speech quality is measured by a bit error rate. It should be noted that the quality measurements should ideally be made for a cell as appropriate for the conditions. For instance, measurements should be done during busy hours in the system since interference tends to be highest then and the largest percentage of the total number of calls are taking place. Quality for a digital channel is for example measured by BER on the up or down link. However, other known parameters such as Frame Erasure Rate and Fading Frequency measures can be used in a known fashion. For an analog channel, other known parameters such as C/I and C/N measurements can be used.

Step 65 may include adjusting the preselected sufficient signal strength threshold using the following algorithm:

If BER>1% for more than 2% of the call time in a cell, the preselected sufficient signal strength threshold is increased by 1 dB; and if BER>1% for less than 0.5% of the call time in this cell, the preselected sufficient signal strength threshold is decreased by 1 dB.

Alternatively, in step 65 the adjusting of the preselected sufficient signal strength threshold includes a non-recursive estimate by a statistical relationship of how much the signal strength threshold should be increased or decreased as earlier described. For instance, step 65 can use a statistical relationship such as determining the probability of a bit error rate being greater than 1% for a given threshold level and determining a threshold level to be increased or subtracted to assure that the probability is within a given range.

It is believed that the operation and construction of the present invention will be apparent from the foregoing description and, while the method and apparatus shown and described has been characterized as being preferred, obvious changes and modifications may be made therein without departing from the spirit and scope of the invention as defined in the following claims.

What is claimed:

1. A method of determining a minimum acceptable signal strength in a cell of a cellular radio system with a hierarchical cell structure comprised of a plurality of levels of cells having base stations and mobile stations, said method comprising:

assigning to each cell according to a level of said cell within said hierarchical cell structure a category of preference for selection with respect to each other associated cell within the system having either a coextensive, adjacent, contiguous, or overlapping service area;

assigning to each associated cell a preselected signal strength threshold as a minimum requirement for radio communication with mobile stations;

determining the communication quality in the cell; and adjusting said preselected signal strength threshold of the cell as a minimum signal strength level at which preferred cell will be prioritized over a non-preferred cell for future communication with mobile stations in the cell in accordance with a criteria for said determined quality.

2. The method according to claim 1, further comprising repeating said determining and adjusting steps if said quality criteria is not satisfied.

3. The method according to claim 1 wherein the quality criteria is a measure of speech quality.

4. The method according to claim 3 where the measure of speech quality is related to a carrier to interference ratio.

5. The method according to claim 3 wherein the speech quality is measured by a bit error rate (BER).

6. A method of determining a minimum acceptable signal strength in a cell of a cellular radio system with a hierarchical cell structure comprised of a plurality of levels of cells having base stations and mobile stations, said method comprising:

assigning to each cell according to a level of said cell within said hierarchical cell structure a category of preference for selection with respect to each other associated cell within the system having either a coextensive, adjacent, contiguous, or overlapping service area;

assigning to each associated cell a preselected signal strength threshold as a minimum requirement for radio communication with mobile stations;

determining the communication quality in the cell; and adjusting said preselected signal strength threshold of the cell as a minimum requirement for communication with mobile stations in the cell in accordance with a criteria for said determined quality, wherein the quality criteria is measured by a bit error rate (BER) and, wherein the adjusting of preselected signal strength threshold includes the following algortihm:

If BER>1% for more than 2% of the call time in a cell, the preselected signal strength threshold is increased by 1 dB; and if BER>1% for less than 0.5% of the call time in this cell, the preselected signal strength threshold is decreased by 1 dB.

7. A method of determining a minimum acceptable signal strength in a cell of a cellular radio system with a hierarchical cell structure comprised of a plurality of levels of cells having base stations and mobile stations, said method comprising:

assigning to each cell according to a level of said cell within said hierarchical cell structure a category of preference for selection with respect to each other associated cell within the system having either a coextensive, adjacent, contiguous, or overlapping service area;

assigning to each associated cell a preselected signal strength threshold as a minimum requirement for radio communication with mobile stations;

determining the communication quality in the cell; and adjusting said preselected signal strength threshold of the cell as a minimum requirement for communication with mobile stations in the cell in accordance with a criteria for said determined quality, wherein the quality criteria is measured by a bit error rate (BER) and, wherein the adjusting of the signal strength threshold includes a non-recursive estimate by a statistical relationship of how much the signal strength threshold should be increased or decreased.

8. A method according to claim 7 wherein the non-recursive estimating step includes determining the probability of a bit error rate being greater than 1% for a given threshold level and determining a threshold level to be increased or subtracted to assure that the probability is within a given range.

9. A method of handoff of a mobile station operating within a cellular radio system in a hierarchical cell structure comprised of a plurality of levels of cells having base stations and mobile stations, said method comprising the steps of:

assigning to each cell according to a level of said within said hierarchical cell structure a category of preference for selection with respect to each other associated cell within the system having either a coextensive, adjacent, contiguous, or overlapping service area;

assigning to each associated cell a preselected signal strength threshold as a minimum requirement for radio communication with mobile stations;

determining the communication quality in the cell;

adjusting said preselected signal strength threshold of the cell as a minimum requirement for communication with mobile stations in the cell in accordance with a measured quality criteria for said determined communication quality;

measuring the signal strength of communications between the mobile station and each base station serving the associated cells;

comparing the measured signal strength to the current thresholds for each of the measured cells respectively; and selecting for the mobile station a base for a communication based upon whether the measured signal strength of said base station is greater than the current signal strength threshold assigned to the cell and whether the base station has a higher category of preference than the currently serving cell.

10. The method according to claim 9, further comprising repeating said determining and adjusting steps if said quality criteria is not satisfied.

11. The method according to claim 9 wherein the quality criteria is a measure of speech quality.

12. The method according to claim 11 wherein the measure of speech quality is related to a carrier to interference ratio.

13. The method according to claim 11 wherein the speech quality is measured by a bit error rate (BER).

14. The method according to claim 13 wherein adjusting of the signal strength threshold includes the following algorithm:

If BER>1% for more than 2% of the call time in a cell, the preselected signal strength threshold is increased by 1 dB; and if BER>1% for less than 0.5% of the call time in this cell, the preselected signal strength threshold is decreased by 1 dB.

15. The method according to claim 9 wherein the adjusting of the current signal strength threshold includes a non-recursive estimate by a statistical relationship of how much the signal strength threshold should be increased or decreased.

16. The method according to claim 15 wherein the non-recursive estimating step includes determining the probability of a bit error rate being greater than 1% for a given threshold level and determining a threshold level to be increased or subtracted to assure that the probability is within a given range.

17. An apparatus of determining a minimum acceptable signal strength in a cell of cellular radio system with a hierarchical cell structure comprised of multiple levels of cells having different service areas and including base stations and mobile stations, said apparatus comprising the steps of:

means for assigning to each cell according to a cell level a category of preference for selection with respect to each other associated cell within the system having either a coextensive, adjacent, contiguous, or overlapping service area;

means for assigning to each associated cell a preselected signal strength threshold as a minimum requirement for radio communication with mobile stations;

means for determining the communication quality in the cell; and means for adjusting said signal strength threshold of the cell as a minimum signal strength level at which preferred cell will be prioritized over a non-preferred cell for future communication with mobile stations in the cell in accordance with a criteria for said determined quality.

18. The apparatus according to claim 17, further comprising means for repeating said determining and adjusting steps if said quality criteria is not satisfied.

19. An apparatus of determining a minimum acceptable signal strength in a cell of cellular radio system with a hierarchical cell structure comprised of multiple levels of cells having different service areas and including base stations and mobile stations, said apparatus comprising the steps of:

means for assigning to each cell according to a cell level a category of preference for selection with respect to each other associated cell within the system having either a coextensive, adjacent, contiguous, or overlapping service area;

means for assigning to each associated cell a preselected signal strength threshold as a minimum requirement for radio communication with mobile stations;

means for determining the communication quality in the cell; and means for adjusting said signal strength threshold of the cell as a minimum requirement for communication with mobile stations in the cell in accordance with a criteria for said determined quality, wherein the means for adjusting the signal strength threshold includes means for recursive estimating according to the following algorithm:

If BER>1% for more than 2% of the call time in a cell, the preselected signal strength threshold is increased by 1 dB; and if BER>1% for less than 0.5% of the call time in this cell, the preselected signal strength threshold is decreased by 1 dB.

20. An apparatus of determining a minimum acceptable signal strength in a cell of cellular radio system with a hierarchical cell structure comprised of multiple levels of cells having different service areas and including base stations and mobile stations, said apparatus comprising the steps of:

means for assigning to each cell according to a cell level a category of preference for selection with respect to each other associated cell within the system having either a coextensive, adjacent, contiguous, or overlapping service area;

means for assigning to each associated cell a preselected signal strength threshold as a minimum requirement for radio communication with mobile stations;

means for determining the communication quality in the cell; and means for adjusting said signal strength threshold of the cell as a minimum requirement for communication with mobile stations in the cell in accordance with a criteria for said determined quality, wherein the means for adjusting the current signal strength threshold includes means for non-recursive estimating by a statistical relationship of how much the signal strength threshold should be increased or decreased.

21. An apparatus according to claim 20 wherein the means for non-recursive estimating includes means for determining the probability of a bit error rate being greater than 1% for a given threshold level and determining a threshold level to be increased or subtracted to assure that the probability is within a given range.

* * * * *